United States Patent Office 3,170,869
Patented Feb. 23, 1965

3,170,869
CLARIFICATION OF AQUEOUS SUSPENSIONS WITH ACETALIZED POLYVINYL ALCOHOL
Saburo Imoto, Kurashiki, Japan, assignor to Kurashiki Rayon Co., Ltd., Kurashiki-shi, Japan, a corporation of Japan
No Drawing. Filed Apr. 3, 1962, Ser. No. 184,688
Claims priority, application Japan, Apr. 8, 1961, 36/12,240
10 Claims. (Cl. 210—54)

This invention relates to methods for clarification of aqueous suspensions.

According to this invention an aqueous suspension is clarified by the addition of 0.01 to 0.5% by weight of a water-soluble acetalized polyvinyl alcohol, based on the weight of suspended material in the suspension. A preferred range of acetalized polyvinyl alcohol is from 0.05 to 0.1% by weight, based on the weight of suspended material.

Suspensions which can be clarified according to the present invention include suspensions of inorganic materials, particularly soil and clay such as bentonite and kaolinite. Organic materials in suspension can also be clarified by the addition of an acetalized polyvinyl alcohol according to this invention. It is also possible to remove materials from solution by adding to the solution a water-insoluble material which adsorbs the solute and then clarifying the resulting suspension with acetalized polyvinyl alcohol.

The acetalized polyvinyl alcohol useful as a clarification agent in this invention is a water-soluble material obtained by acetalizing polyvinyl alcohol with an aldehyde. Preferably the aldehyde contains no more than 24 carbon atoms, and in a preferred embodiment contains from 7 to 12 carbon atoms. Typical of the aldehydes which may be used to make the acetalized polyvinyl alcohol useful in this invention are unsubstituted aliphatic aldehydes such as formaldehyde, acetaldehyde, butyraldehyde, heptaldehyde, decylaldehyde, and crotonaldehyde, and aromatic aldehydes such as benzaldehyde. The acetalized polyvinyl alcohols which are useful in this invention can be prepared by known means, such as reaction of polyvinyl alcohol with the desired aldehyde in the presence of a mineral acid such as hydrochloric acid or sulfuric acid.

As previously indicated the acetalized polyvinyl alcohol is water-soluble; this limits the maximum degree of acetalization, since solubility decreases as percentage acetalization increases. Usually the degree of acetalization does not exceed 15%. The minimum degree of acetalization is 1%. The degree of acetalization is the percentage of hydroxyl groups in the polyvinyl alcohol molecule which has reacted with the aldehyde.

The acetalized polyvinyl alcohols for this invention are preferably obtained from fully hydrolyzed or substantially fully hydrolyzed polyvinyl alcohol. However, it is possible to acetalize partially hydrolyzed polyvinyl alcohol having a percentage hydrolysis of approximately 80% or greater, or compounds of vinyl alcohol with various other compounds such as allyl alcohol, isopropenyl alcohol, methyl vinyl ether, provided the vinyl alcohol content of the copolymer is at least about 80 mol percent.

The effectiveness of acetalized polyvinyl alcohol as a clarifying agent is not affected by the pH of the suspension to which it is added.

This invention will now be described in greater detail with reference to a specific embodiment thereof.

EXAMPLE 1

A suspension of 1% by weight of kaolinite in water was adjusted to pH 6 with caustic soda. Acetalized polyvinyl alcohol obtained by reacting polyvinyl alcohol having a degree of polymerization of 1700 with formaldehyde was added to samples of the suspension to cause clarification. The percentage of acetalization, the amount of acetalized polyvinyl alcohol based on the weight of suspended material, added, and the percentage of clarification expressed as the weight ratio of material in suspension after standing for 1 hour at 30° C. to the weight of material originally in suspension, are given in Table 1 below:

Table 1

| Acetalization (percent) | Amount of Acetalized Polyvinyl Alcohol (percent) | Clarification (percent) |
|---|---|---|
| 4.5 | 0.05 | 50 |
| 4.5 | 0.06 | 82 |
| 4.5 | 0.07 | 91 |
| 4.5 | 0.1 | 98 |
| 4.5 | 0.25 | 99 |
| 4.5 | 0.5 | 99 |
| 4.5 | 1.0 | 52 |
| 10 | 0.05 | 99 |
| 10 | 0.1 | 99 |
| 13.8 | 0.05 | 98 |
| 13.8 | 0.1 | 99 |
| 13.8 | 0.5 | 99 |
| 13.8 | 1.0 | 97 |

EXAMPLE 2

A 1% aqueous suspension of kaolinite was adjusted to pH 6. To samples of the suspension was added 3.6% acetalized polyvinyl alcohol obtained by reacting polyvinyl alcohol (D.P. 1700) with butyraldehyde. The amount of acetalized polyvinyl alcohol added and the percentage clarification are shown in Table 2 below:

Table 2

| Amount of Acetalized Polyvinyl Alcohol (percent) | Clarification (percent) |
|---|---|
| 0.05 | 90 |
| 0.1 | 92 |
| 0.25 | 99 |
| 0.5 | 99 |
| 0.6 | 98 |
| 1.0 | 80 |

EXAMPLE 3

To a 1% suspension of kaolinite in water adjusted to pH 6 was added acetalized polyvinyl alcohol obtained by acetalizing polyvinyl alcohol (D.P. 1700) with heptaldehyde. The percentage acetalization, amount of acetalized polyvinyl alcohol added, and the percentage clarification are shown in Table 3 below:

Table 3

| Acetalization (percent) | Amount of Acetalized Polyvinyl Alcohol (percent) | Clarification (percent) |
|---|---|---|
| 1.8 | 0.1 | 75 |
| 6.9 | 0.05 | 77 |

EXAMPLE 4

A 1% aqueous suspension of kaolinite was adjusted to pH 6. Acetalized polyvinyl alcohol having an acetalization of 1.1% was made by reacting fully hydrolyzed polyvinyl alcohol with decylaldehyde. Acetalized partially hydrolyzed polyvinyl alcohol was made by reacting decylaldehyde with partially hydrolized polyvinyl alcohol having a hydrolysis of about 87% and a degree of polymerization of 1700 until a 10% acetalized polyvinyl alcohol is obtained. Each of these acetalized polyvinyl alcohols was added to a sample of the suspension. Clarification is indicated in Table 4 below:

*Table 4*

| Type of Polyvinyl Alcohol | Acetalization (percent) | Amount of Acetalized Polyvinyl Alcohol (percent) | Clarification (percent) |
|---|---|---|---|
| Fully hydrolyzed | 1.8 | 0.05 | 82 |
| Do | 1.8 | 0.1 | 97 |
| Do | 1.8 | 0.18 | 97 |
| Do | 1.8 | 0.25 | 95 |
| Partially hydrolyzed | 10 | 0.05 | 75 |
| Do | 10 | 0.1 | 81 |

EXAMPLE 5

To an aqueous suspension of 0.5% by weight of bentonite was added 2.6% acetalized polyvinyl alcohol obtained by acetalizing polyvinyl alcohol (D.P. 1700) with decylaldehyde. This acetalized polyvinyl alcohol was added in varying amounts to samples of the suspension, each sample having a volume of 25 ml. The solution was allowed to stand for 2 hours at room temperature. The amount of acetalized polyvinyl alcohol and the volume of sediment obtatined in each case are shown in Table 5 below:

*Table 5*

Amount of acetalized polyvinyl alcohol, (percent): Sediment volume (ml.)
- None — 0
- 4 — 4.0
- 6 — 15.4
- 8 — 7.6
- 12 — 2.3

As will be seen from the above table the greatest amount of clarification as shown by the largest sediment volume was obtained with 6% by weight of clarification agent.

This procedure was repeated using partially hydrolyzed polyvinyl alcohol (D.P. 1700) which was acetalized to 10 mol percent with decylaldehyde. An addition of 8% by weight of this clarifying agent to an 0.5% aqueous suspension of bentonite resulted in a sediment volume of 9.1 ml. after standing for 2 hours.

EXAMPLE 6

To samples of a 1% suspension of kaolinite in water adjusted to pH 6, were added 0.1% by weight, based on the weight of kaolinite in suspension, of polyvinyl alcohol (D.P. 1700) acetalized with benzaldehyde. To a third sample was added acetalized partially hydrolyzed polyvinyl alcohol which was 10% acetalized with benzaldehyde. The percentage acetalization and the sediment volume after standing for 2 hours at 20° C. are shown in Table 6 below:

*Table 6*

| Type of Polyvinyl Alcohol | Acetalization (percent) | Sediment Volume (ml.) |
|---|---|---|
| Fully hydrolyzed | 2.8 | 0.6 |
| Do | 4.4 | 0.4 |
| Partially hydrolyzed | 10 | 0.3 |

While this invention has been described with respect to specific embodiments thereof, the scope of this invention is to be measured only by the scope of the appended claims.

I claim:
1. A process for clarifying an aqueous suspension which comprises adding to said suspension from 0.01 to 0.5%, based on the weight of suspended material, of acetalized polyvinyl alcohol wherein the degree of acetalization of the polyvinyl alcohol is at least about 1% but less than about 15%.
2. A process according to claim 1 wherein said acetalized polyvinyl alcohol is prepared by acetalization with an aldehyde containing from 1 to 24 carbon atoms.
3. A process according to claim 1 wherein said acetalized polyvinyl alcohol is prepared by acetalization with an unsubstituted aldehyde containing from 1 to 24 carbon atoms.
4. A process according to claim 1 wherein the amount of acetalized polyvinyl alcohol is in the range of 0.05 to 0.1%, based on the weight of suspended material.
5. A process according to claim 1 wherein said acetalized polyvinyl alcohol is prepared by the acetalization of a polyvinyl alcohol containing at least about 80 mol percent of vinyl alcohol.
6. A process for clarifying an aqueous suspension of inorganic material which comprises adding to said suspension from 0.01 to 0.5%, based on the weight of suspended material, of acetalized polyvinyl alcohol wherein the degree of acetalization of the polyvinyl alcohol is at least about 1% but less than about 15%.
7. A process according to claim 6 wherein said inorganic material is clay.
8. A process according to claim 6 wherein said acetalized polyvinyl alcohol is prepared by acetalization with an aldehyde containing from 1 to 24 carbon atoms.
9. A process according to claim 6 wherein the amount of acetalized polyvinyl alcohol is in the range of 0.05 to 0.1%, based on the weight of suspended inorganic material.
10. A process according to claim 6 wherein said acetalized polyvinyl alcohol is prepared by the acetalization of a polyvinyl alcohol containing at least about 80 mol percent of vinyl alcohol.

References Cited in the file of this patent
UNITED STATES PATENTS

| 2,136,110 | Lane et al. | Nov. 8, 1938 |
| 2,138,073 | Schweitzer | Nov. 29, 1938 |
| 2,354,648 | Bond | Aug. 1, 1944 |
| 2,981,630 | Rowland | Apr. 25, 1961 |

FOREIGN PATENTS

| 356,408 | Great Britain | Sept. 10, 1931 |

OTHER REFERENCES

"Aggregation of Suspensions by Polyelectrolytes," Michaels, Ind. & Eng. Chem., July 954, vol. 46, pages 1485–90.